(12) United States Patent
Lyman et al.

(10) Patent No.: US 10,710,757 B2
(45) Date of Patent: Jul. 14, 2020

(54) WEIGH-IN-MOTION SCALE SYSTEM AND METHOD FOR LINEAR SYNCHRONOUS MOTOR CONVEYOR

(71) Applicant: The Procter & Gamble Company, Cincinnati, OH (US)

(72) Inventors: Christopher Robert Lyman, Milford, OH (US); Michael Granitz, Mason, OH (US); Daniel Richard Royce, Blue Ash, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 378 days.

(21) Appl. No.: 15/698,691

(22) Filed: Sep. 8, 2017

(65) Prior Publication Data

US 2018/0073912 A1    Mar. 15, 2018

Related U.S. Application Data

(60) Provisional application No. 62/385,293, filed on Sep. 9, 2016.

(51) Int. Cl.
| | | |
|---|---|---|
| *B65G 23/23* | (2006.01) | |
| *G01G 19/03* | (2006.01) | |
| *G01G 11/00* | (2006.01) | |
| *B65B 43/52* | (2006.01) | |
| *G06Q 30/06* | (2012.01) | |

(Continued)

(52) U.S. Cl.
CPC ............... *B65B 43/52* (2013.01); *B65B 3/04* (2013.01); *B65B 7/00* (2013.01); *B65B 59/00* (2013.01); *B65B 65/006* (2013.01); *B65G 23/23* (2013.01); *G01G 11/00* (2013.01); *G01G 19/03* (2013.01); *G05B 19/41865* (2013.01); *G06Q 30/06* (2013.01); *G06Q 30/0621* (2013.01); *G06Q 30/0635* (2013.01); *B65G 35/06* (2013.01); *B65G 47/642* (2013.01); *B65G 54/02* (2013.01);
(Continued)

(58) Field of Classification Search
CPC ......... G01G 11/00; G01G 19/03; B65G 23/23
See application file for complete search history.

(56) References Cited

U.S. PATENT DOCUMENTS

| 4,231,439 A | * | 11/1980 | Hall, Jr. | ............... G01G 19/035 177/1 |
|---|---|---|---|---|
| 4,805,761 A | | 2/1989 | Totsch | |

(Continued)

*Primary Examiner* — Natalie Huls
(74) *Attorney, Agent, or Firm* — Andres E. Velarde; Jeffrey V. Bamber

(57) ABSTRACT

A weigh-in-motion scale system for a linear synchronous motor conveyor and a method for weighing objects on a linear synchronous motor conveyor are described herein. In one embodiment, the weigh-in-motion scale system includes a support structure for supporting the following: a weigh cell, a section of a linear synchronous motor conveyor track, a vehicle for transporting an object, and an object; and a weigh cell on the support structure on which a section of a linear synchronous motor conveyor track rests directly or indirectly. In one embodiment, the method includes transporting a vehicle with an object thereon along a section of a linear synchronous motor conveyor track; and at a weighing station while the vehicle with the object thereon is being transported, weighing the section of a linear synchronous motor conveyor track, vehicle, and object to determine the weight of the object.

7 Claims, 3 Drawing Sheets

(51) Int. Cl.
    *B65B 3/04*         (2006.01)
    *B65B 7/00*         (2006.01)
    *B65B 59/00*       (2006.01)
    *B65B 65/00*       (2006.01)
    *G05B 19/418*      (2006.01)
    *B65G 47/64*        (2006.01)
    *B65G 54/02*        (2006.01)
    *B65G 35/06*        (2006.01)

(52) U.S. Cl.
    CPC ................ *B65G 2201/0235* (2013.01); *G05B 2219/42337* (2013.01)

(56) References Cited

U.S. PATENT DOCUMENTS

| | | | |
|---|---|---|---|
| 4,841,869 A * | 6/1989 | Takeuchi | B60L 13/04 |
| | | | 104/140 |
| 5,023,495 A | 6/1991 | Miyao | |
| 5,230,391 A * | 7/1993 | Murata | G01G 11/00 |
| | | | 177/145 |
| 6,354,781 B1 | 3/2002 | Pan | |
| 6,876,869 B1 | 4/2005 | Fujii | |
| 7,988,398 B2 | 8/2011 | Hofmeister | |
| 9,611,107 B2 | 4/2017 | Wernersbach | |
| 9,671,418 B2 | 6/2017 | Mellars | |
| 9,802,507 B2 | 10/2017 | Clark | |
| 9,809,392 B2 | 11/2017 | Walter | |
| 9,847,742 B2 | 12/2017 | Suzuki | |
| 9,914,994 B2 | 3/2018 | Leahey | |
| 10,158,304 B2 | 12/2018 | Suzuki | |
| 10,167,143 B2 | 1/2019 | Senn | |
| 2015/0352596 A1 * | 12/2015 | Yamakawa | G01G 19/03 |
| | | | 209/596 |
| 2016/0195423 A1 * | 7/2016 | Cassoni | G01G 15/00 |
| | | | 177/1 |
| 2016/0257502 A1 * | 9/2016 | Fujihara | B65G 65/005 |
| 2016/0370221 A1 * | 12/2016 | Schrag | G01G 7/02 |
| 2017/0050332 A1 * | 2/2017 | Bauer | B26D 7/32 |
| 2017/0174445 A1 * | 6/2017 | Nichau | B65G 47/681 |
| 2018/0075506 A1 * | 3/2018 | Burkhard | G01G 11/00 |
| 2018/0086564 A1 * | 3/2018 | Clossner | B65G 17/48 |

* cited by examiner

WEIGH-IN-MOTION SCALE SYSTEM AND METHOD FOR LINEAR SYNCHRONOUS MOTOR CONVEYOR

FIELD OF THE INVENTION

A weigh-in-motion scale system for a linear synchronous motor conveyor and a method for weighing objects on a linear synchronous motor conveyor are described herein.

BACKGROUND OF THE INVENTION

Numerous types of conveyors can be used in manufacturing facilities. In some embodiments, the conveyor can be a linear synchronous motor (LSM) based system that facilitates propulsion of vehicles along the track using electromagnetic force (EMF). MagneMotion, Inc. of Devens, Mass., U.S.A., and other companies hold a number of patents directed to such systems. Patent publications directed to such systems include the following: U.S. Pat. No. 6,011,508, Perreault, et al.; U.S. Pat. No. 6,101,952, Thornton, et al.; U.S. Pat. No. 6,499,701, Cho; U.S. Pat. No. 6,578,495, Yitts, et al.; U.S. Pat. No. 6,781,524, Clark, et al.; U.S. Pat. No. 6,917,136, Thornton, et al.; U.S. Pat. No. 6,983,701, Thornton, et al.; U.S. Pat. No. 7,011,728 B2, Dewig, et al.; U.S. Pat. No. 7,264,426 B2, Buttrick, Jr.; U.S. Pat. No. 7,448,327, Thornton, et al.; U.S. Pat. No. 7,458,454, Mendenhall; U.S. Pat. No. 8,591,779 B2, Senn, et al.; U.S. Pat. No. 9,032,880, Senn, et al.; U.S. Pat. No. 9,233,800 B2, Senn, et al.; U.S. Pat. No. 9,283,709 B2, Lindner, et al.; US Patent Application Publication US 2016/114988 A1; and, EP Patent 1 645 340 B1.

When manufacturing products such as liquid, powder, and other such products that are packaged in bottles or other containers, it is desirable to weigh each container after it has been filled to ensure that the container contains the proper amount of the product. Manufacturing systems using traditional belt or chain conveyors typically include a "checkweigher" along the conveyor to measure the weight of the filled containers. Some checkweighers require that the article be stationary when it is weighed. Other checkweighers are capable of weighing the filled containers when the containers are in motion while being conveyed by the conveyor. Still other systems require that the articles be removed from the conveyor in order to weigh each article.

Linear synchronous motor conveyor systems present particular challenges when it is desired to weigh an article being conveyed (that is, while the article is in motion) on the LSM conveyor. It was previously thought that placing a linear motor conveyor on top of a weigh cell would not work for several reasons. First, linear synchronous motor conveyors typically employ vehicles to convey the articles around the track. The weight of these vehicles must be subtracted from the weight measurement. Second, linear synchronous motors are relatively heavy in comparison to the article being weighed and present a large "dead load" that would need to be weighed along with the article. Third, linear synchronous motors have power and communication cables attached thereto that would have to be part of the weight measurement. Fourth, linear synchronous motor conveyors are typically comprised of sections of track. There can be small gaps between the sections of track that the object to be weighed will have to traverse as it transitions onto and off of the weigh cell. When the object travels over these gaps, this can cause vibrations in the weigh cell and the object being weighed, both of which can cause errors in the measured weight. Such errors can be further compounded when measuring the weight of liquids in moving containers due to the tendency of liquids to "slosh" or move inside the containers. Fifth, checkweighers are typically used in production systems to weigh many of the same general size and weight of articles for long periods of time during that production run. It is desirable to use a checkweigher on a production line that is capable of producing a wide variety of different size and weight of articles in which there may be a large swing in total weight from one measurement to the next.

Thus, there is a need for a weigh-in-motion scale system that can be used on a linear synchronous motor conveyor. In particular, there is a need for a weigh-in-motion scale system that can be used on a high speed linear synchronous motor conveyor that can weigh articles with a relatively wide variety of weights with high accuracy.

SUMMARY OF THE INVENTION

A weigh-in-motion scale for a linear synchronous motor conveyor and a method for weighing objects on a linear synchronous motor conveyor are described herein.

In one embodiment, a weigh-in-motion system for weighing objects on a linear synchronous motor conveyor is disclosed. The linear synchronous motor comprises a plurality of propulsion coils and the conveyor comprises a cable supplying power to the propulsion coils. The weigh-in-motion system comprises: a) a support structure for supporting the following: a weigh cell, a section of a linear synchronous motor conveyor track, a vehicle for transporting an object, and an object; and b) a weigh cell on said support structure on which a section of a linear synchronous motor conveyor track rests directly or indirectly, wherein said weigh cell is configured to weigh vehicles and objects while in motion. Numerous arrangements of the support structure relative to these other items or components are possible. Several non-limiting arrangements include those in which the section of linear synchronous motor conveyor track supported by the support structure does not include a section of the linear synchronous motor; and, those in which the support structure is configured to also support at least one section of the linear synchronous motor.

Several non-limiting examples of the latter arrangement are as follows. In one example, sections of the linear synchronous motor are positioned adjacent to one another, and the support structure is configured to support a section of the linear synchronous motor without supporting one or more adjacent sections of the linear synchronous motor. In another example, the support structure is configured to support two sections of linear synchronous motor and one section of linear synchronous motor conveyor track, and the section of the linear synchronous motor track supported by the support structure spans at least portions of the two sections linear synchronous motor. In another example, the section of linear synchronous motor conveyor track and the section of the linear synchronous motor supported by the support structure are coextensive. In another example, the section of linear synchronous motor conveyor track and the section of the linear synchronous motor supported by the support structure each have ends that are not coextensive, wherein the section of track is shorter than the section of linear synchronous motor, wherein at least one end of said section of track terminates short of at least one end of said section of the linear synchronous motor, and a portion at the end of at least one adjacent section of track is cantilevered over the section of linear synchronous motor supported by said support structure.

A method for weighing objects on a linear synchronous motor conveyor is also disclosed. The method for weighing objects on a linear synchronous motor conveyor comprises:
  a. providing a weigh-in-motion system comprising:
     i. a support structure for supporting the following: a weigh cell, a section of a linear synchronous motor conveyor track, a vehicle for transporting an object, and an object; and
     ii. a weigh cell on said support structure on which a section of a linear synchronous motor conveyor track rests;
  b. transporting a vehicle with an object thereon along said section of a linear synchronous motor conveyor track; and
  c. at a weighing station while said vehicle with an object thereon is being transported (that is, while the object is in motion on the vehicle), weighing the section of a linear synchronous motor conveyor track, vehicle, and object to determine the weight of said object.

DETAILED DESCRIPTION OF THE INVENTION

A weigh-in-motion scale system for a linear synchronous motor conveyor and a method for weighing objects on a linear synchronous motor conveyor are described herein.

Figure 1:
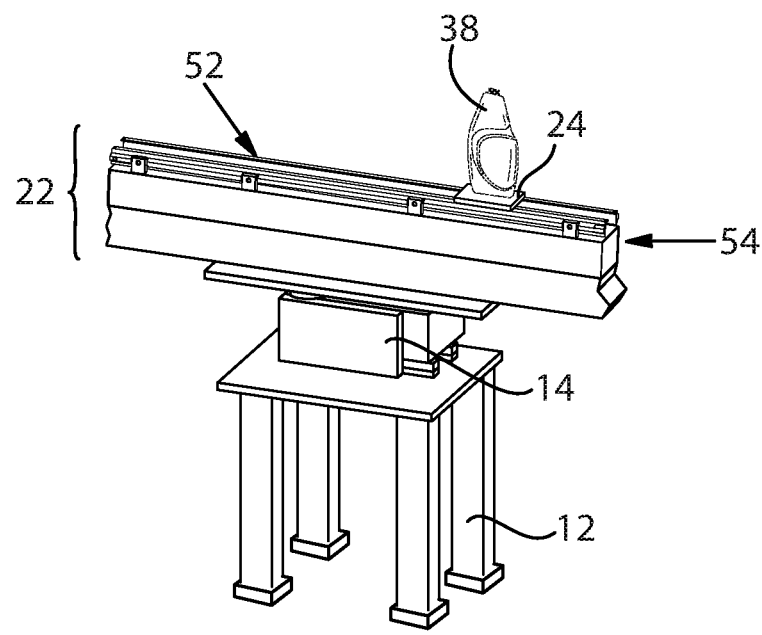
FIG. 1 is a schematic perspective view of one example of a bottle being conveyed over a linear synchronous motor conveyor positioned over a weigh cell.

FIG. 1 shows one non-limiting example of weigh-in-motion system 10 for weighing articles (or "objects") on a linear synchronous motor conveyor. Although only a portion of the linear synchronous motor conveyor is shown, it is understood that the entire linear synchronous motor conveyor can be in any suitable configuration known in the art, including but not limited in the form of a closed loop. It is also understood that the linear synchronous motor conveyor will typically comprise a controller for controlling the movement of vehicles along the same. Such systems are further described in provisional U.S. Patent Application Ser. No. 62/385,293, filed Sep. 9, 2016.

In the example shown, the object is a bottle 38 that is being conveyed by a vehicle 24 which is traveling on a linear synchronous motor (LSM) conveyor 22. The LSM conveyor comprises a track 52 and a linear motor component (or "base") 54. The track 52 may comprise rails or some other suitable surface(s) upon which the vehicle 24 can move. The linear motor component (or "base") 54 may be in the form of a housing that contains one or more propulsion coils therein. In some (but not all) cases, the track (e.g., rails) 52 can be joined to, and spaced apart from, the base 54.

The term "joined to", as used throughout this specification, encompasses configurations in which an element is directly secured to another element by affixing the element directly to the other element; configurations in which the element is indirectly secured to the other element by affixing the element to intermediate member(s) which in turn are affixed to the other element; and configurations in which one element is integral with another element, i.e., one element is essentially part of the other element.

The weigh-in-motion system 10 shown in FIG. 1 comprises a support structure 12 and a weigh cell 14. The support structure 12 may rest on the ground or on a floor 16. One suitable linear synchronous motor (LSM) conveyor is the MAGNEMOVER LITE™ available from MagneMotion, Inc. of Devens, Mass., U.S.A. MagneMotion sells modular sections of its MAGNEMOVER LITE™ linear synchronous motor (LSM) conveyor. Sections of the track (e.g., rails) 52 are sold in lengths of 250 mm and 1,000 mm. Sections of the linear synchronous motor components (the base) 54 are sold in the same lengths.

Figure 1A:
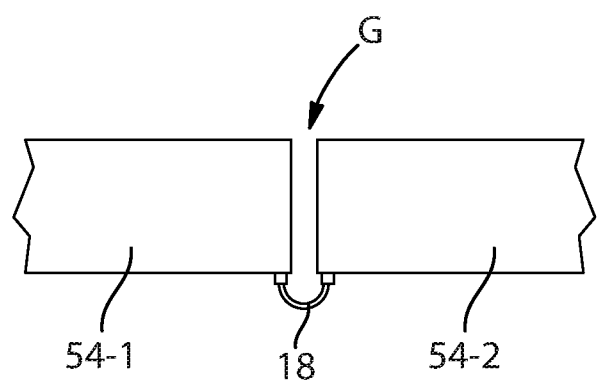
FIG. 1A is a fragmented schematic side view showing the power and communication cables extending between two linear synchronous motor sections.

FIG. 1A shows the power and communication cables 18 extending between two linear synchronous motor sections 54-1 and 54-2. FIG. 1A also shows the gap, G, between adjacent linear synchronous motor sections 54-1 and 54-2. It was previously believed that it would be difficult to obtain accurate weights of objects on LSM conveyors due to (among other things) these cables 18 connecting sections of the LSM motor system. However, it has been found that the effect of such cables 18 on the weight measurements can be minimized, or virtually eliminated, by using one of several techniques. One technique is to include the weight of the cables 18 in the tare weight of the portion of the LSM motor being weighed, and to subtract that tare weight from the total weight when calculating the weight of the object. In such a case, however, care must be taken not to bump or otherwise disturb the cables 18 as this has been found to change their tare weight. Another technique is to remove insulation from the cables 18 to reduce the stiffness of the cables, thereby reducing the force exerted onto the section of motor that is being weighed. Still another technique is to wind up the cables 18 into a tighter configuration to form a low stiffness "coiled spring" shape to reduce the force exerted onto the section of motor that is being weighed.

The support structure 12 can comprise any suitable type of structure that can support the following items and or components: the article 38 being weighed; any vehicle 24 on which the article is being conveyed; a portion of the track 52; optionally a portion of the linear motor component 54; and, the weigh cell 14. In the non-limiting embodiments shown in the drawings, the support structure 12 is in the form of a frame. However, many other types of support structures are also possible. In some cases, the weigh cell may not need a support structure, and the weigh cell may be placed onto the ground or onto a floor. In addition, numerous arrangements of the support structure 14 relative to these other items or components are possible. Several non-limiting arrangements are described below. These may be designated as Options A through D. Three of these options (A, C, and D) weigh the entire LSM motor section along with the article.

Figure 2:
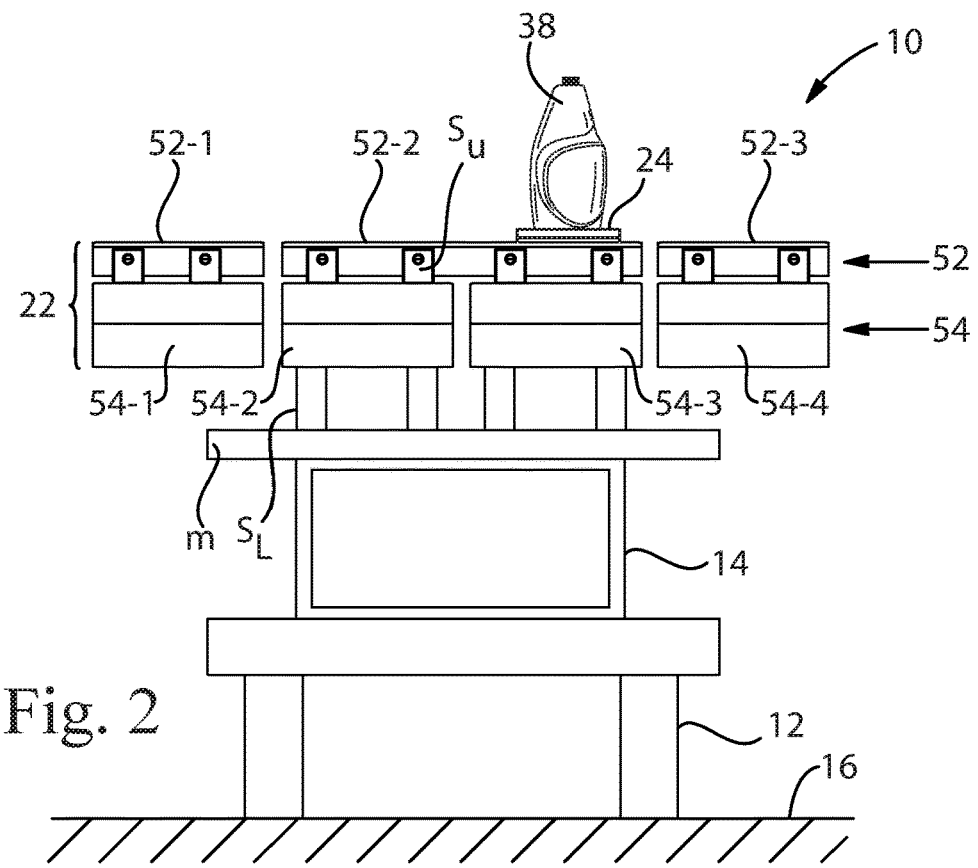
FIG. 2 is a schematic side view of one option for mounting a linear synchronous motor conveyor on a weigh cell.

FIG. 2 shows one option (Option A) for mounting a portion of a linear synchronous motor conveyor on a weigh cell 14. In the example shown in FIG. 2, there are four motor sections 54-1, 54-2, 54-3, and 54-4. These four motor sections can be of any length or lengths. They can be of the same or different lengths. In this particular example, the four motor sections 54-1, 54-2, 54-3, and 54-4 are each 250 mm in length. Two of these motor sections (the inner or middle two sections 54-2 and 54-3) share a common section of track 52-2 that overlies these two inner motor sections 54-2 and 54-3. There are two motor sections (outer motor sections 54-1 and 54-4) that are positioned on each side outside the two inner motor sections 54-2 and 54-3. As shown in FIG. 2, in this example arrangement of the mounting configuration, only the middle two motor sections 54-2 and 54-3 with their shared section of track 52-2 are placed on top of the weigh cell 14 and support structure 12. The cable 18 between the middle two motor sections 54-2 and 54-3 is not shown, but will also be weighed. FIG. 2 shows that there are upper support elements (or "upper supports") $S_U$ that join and/or support the track sections on the motor sections. There are lower support elements (or "lower supports") $S_L$ that join and/or support the motor sections on a member, m, that rests on top of the weigh cell 14. Thus, those are the only components of the LSM conveyor along with the article 38 and holder/vehicle 24 that are weighed.

Figure 3:
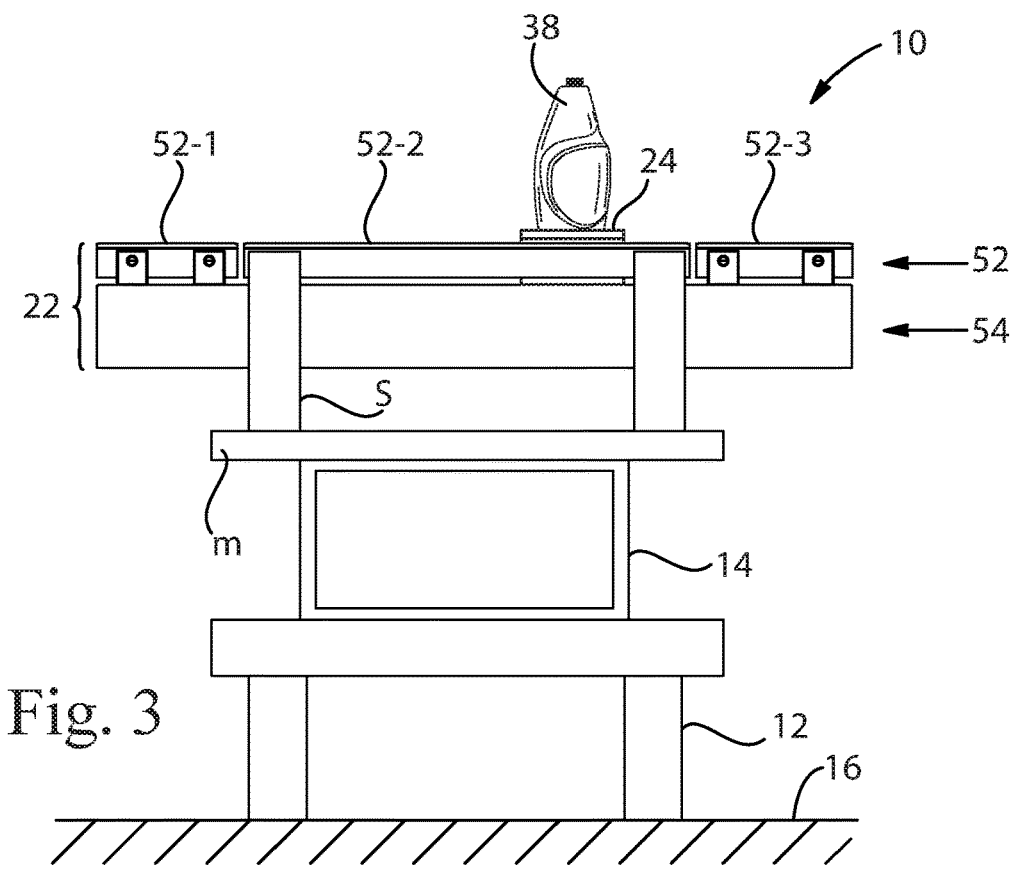
FIG. 3 is a schematic side view of another option for mounting a linear synchronous motor conveyor on a weigh cell.

FIG. 3 shows another option (Option B) for mounting a portion of a linear synchronous motor conveyor 22 on a weigh cell 14. In the example shown in FIG. 3, there is one motor section 54. This motor section 54 can be of any length. In this particular example, the motor section is 1,000 mm in length. Three sections of track 52-1, 52-2, and 52-3 overly and are joined to the motor section 54. The sections of track comprise a central section of track 52-2 and two outer sections of track 52-1 and 52-3. The central and outer sections of track can be of any suitable lengths. In this particular example, the central section of track 52-2 is 500 mm in length, and the outer sections of track 52-1 and 52-3 are each 250 mm in length. As shown in FIG. 3, in this example arrangement of the mounting configuration, the middle section of track 52-2 is placed on direct support elements (or "supports"), S, that are directly on top of the weigh cell 14, and no portion of the section of the motor 54 is weighed. Thus, only the middle section of track 52-2 along with the article 38 and holder/vehicle 24 that are weighed. This embodiment has the advantage that it does not weigh the large "dead load" presented by the section of motor 54 along with the article. It also eliminates any issues with the power and communication cables 18 of the LSM motor from being included in the weight measurement. Option B is desirable for these reasons, however, it requires that there be no ferritic steel in the section of motor.

Figure 4:
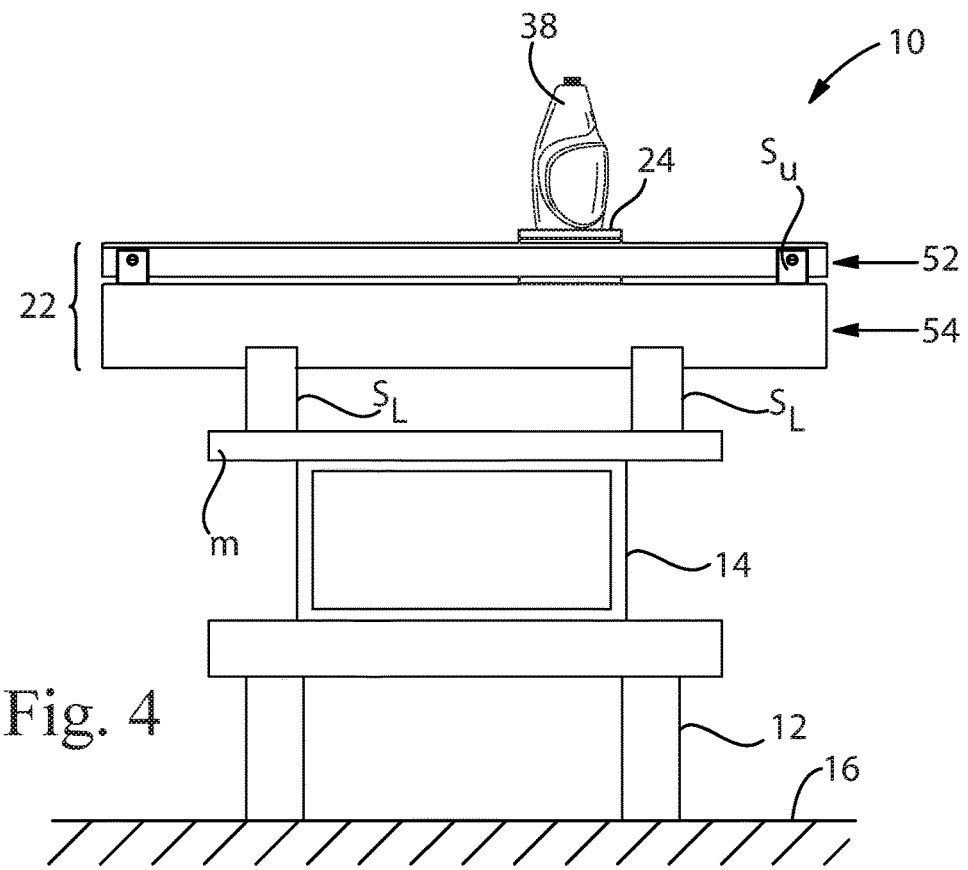
FIG. 4 is a schematic side view of another option for mounting a linear synchronous motor conveyor on a weigh cell.

FIG. 4 shows another option (Option C) for mounting a portion of a linear synchronous motor conveyor 22 on a weigh cell 14. In the example shown in FIG. 4, there is one motor section 54 and one coextensive section of track 52. The motor section 54 and coextensive section of track 52 can be of any length. In this particular example, the motor section 54 and section of track 52 are each 1,000 mm in length. As shown in FIG. 4, in this example arrangement of the mounting configuration, the motor section 54 and coextensive section of track 52 are placed directly on top of the weigh cell 14 and weighed along with the article 38 and holder/vehicle 24.

Figure 5:
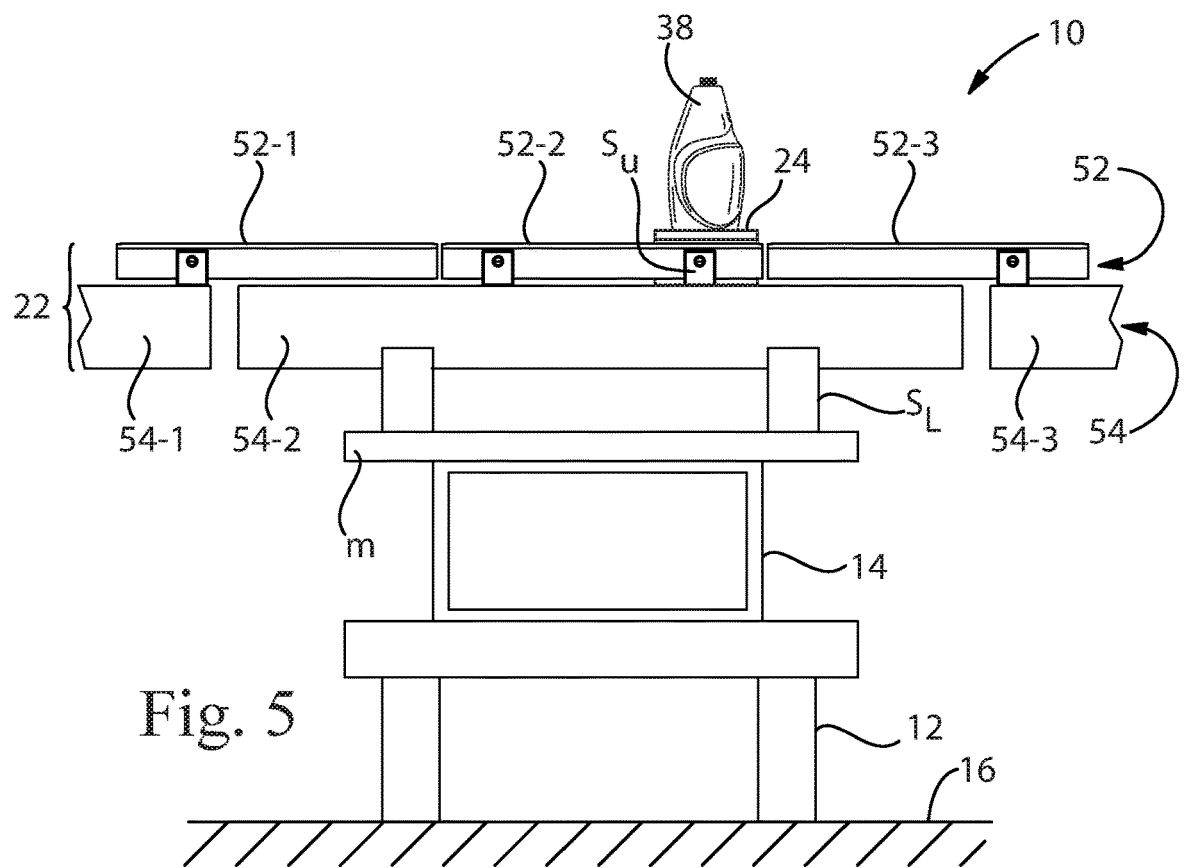
FIG. 5 is a schematic side view of another option for mounting a linear synchronous motor conveyor on a weigh cell.

FIG. 5 shows another option (Option D) for mounting a portion of a linear synchronous motor conveyor 22 on a weigh cell 14. In the example shown in FIG. 5, one entire (central) motor section 54-2 is shown along with fragmented portions of two adjacent motor sections 54-1 and 54-3. The central motor section 54-2 can be of any length. In this particular example, the central motor section 54-2 is 1,000 mm in length. Three sections of track 52-1, 52-2, and 52-3 overlie and are joined to one of the motor sections 54-1, 54-2, and 54-3. There is a central section of track 52-2 and two outer sections of track 52-1 and 52-3. As shown in FIG. 5, in this example arrangement of the mounting configuration, the middle section of track 52-2 and the section of motor 54-2 are placed on top of the weigh cell 14 and support structure 12 and weighed along with the article 38 and holder/vehicle 24. Since the middle section of track 52-2 is shorter than the motor section 54-2, there are adjacent sections of track 52-1 and 52-3 on either side of the middle section of track 52-2 that are supported in a cantilevered manner over the outer portions of the central motor section 54-2. The sections of track 52-1, 52-1, and 52-3 can be of any suitable lengths. In this particular example, the central section of track 52-2 is 500-600 mm in length, and the cantilevered portions of the outer sections of track 52-1 and 52-3 are each 200 mm in length. Option D is unique in the fact that there are significant portions of the conveyor (100-500 mm) where the article 38 is being propelled by the section of the LSM motor being weighed 54-2, but the weight of the article 38 is being supported by a cantilevered track section (on both infeed and outfeed to and from the area of the checkweigher).

The weigh cell 14 can be any suitable type of weigh cell. Weigh cells include but are not limited to strain gage and electromagnetic force restoration (EMFR) weigh cells. However, strain gages have difficulty handling large dead loads with accuracy. In one example, the weigh cell 14 is an EMFR weigh cell. EMFR weigh cells have the ability to handle large dead loads without losing accuracy, and a fast response time. A suitable EMFR weigh cell is available from Wipotec of Roswell, Ga., U.S.A.

The method for weighing objects on a linear synchronous motor conveyor comprises providing a weigh-in-motion system as described above. The method further comprises transporting a vehicle 24 with an object 38 thereon along a section of a linear synchronous motor conveyor track. The method further comprises at a weighing station while the vehicle 24 with the object 38 thereon is being transported (that is, while the object and the vehicle are in motion), weighing the section of a linear synchronous motor conveyor track 22, vehicle 24, and object 38 to determine the weight of the object 38. The system and method described herein can be used to weigh the vehicle 24 and object 38 when the vehicle 24 is moving at slow speeds (such as 0.2 m/s) up to the higher speeds described below. The system described herein can, of course, also be used to weigh the vehicle 24 and the object 38 when the vehicle 24 is stationary.

If desired, the checkweigher may tare itself with no vehicles on it periodically (e.g., every 5 minutes). That is to say that the "dead load" weight may be re-established periodically. This is advantageous to compensate for changes in the "dead load" weight caused, for example, by wear, contamination on the linear synchronous motor track 22 or other part of the "dead load", removal of contamination, or other factors that may change the apparent weight of the "dead load" equipment. If the "dead load" tare result is significantly different from a previous result, an alarm alerts an operator and prevents the system from weighing until action is taken.

In some cases, there are multiple vehicles 24 and each vehicle has a tare weight. If the tare weight of the vehicles 24 are sufficiently similar, the method may comprise subtracting a fixed tare weight (that approximates the tare weight of all the vehicles) from the reading on the weigh cell. In other cases, the method may further comprise:

assigning an identification designation to each vehicle; and the step of weighing further comprises identifying which vehicle is carrying an object being weighed (such as by using the controller) and subtracting the identified vehicle's tare weight from the reading on the weigh cell. In the latter case, it may be desirable to occasionally, periodically, or continually, send the empty vehicles to the checkweigher to check the tare weight of the vehicles to ensure that the vehicles' tare weights have not changed due to wear, spillage, or other events. Also, each type of vehicle may have a minimum and maximum acceptable tare weight. If a vehicle's empty weight measurement is outside of that range, the vehicle may be directed to a designated location other than on the checkweigher (such as a maintenance station), where an operator may be alerted. This is useful to prevent blocking use of the checkweigher when a problem occurs with a vehicle.

The system and method described herein can be used with a particular conveyance system comprising a controller that is capable of periodically sending "calibration vehicles" (or "calibration cars") to the checkweigher in order to verify weigh cell accuracy. This particular conveyance system also provides the ability to permit periodic, or if desired continual, checking of the vehicle identification (vehicle ID) and assigned tare weight.

The weigh-in-motion scale system may be used in cases where the weights of the different objects to be weighed are expected to vary little, or in any combination of use cases, where some objects are expected to have similar weights, and other objects are expected to have different weights.

The weigh-in-motion scale system can, if desired, be used to weigh articles with a relatively wide variety of weights, with high accuracy. The articles being weighed can range in weight from greater than 5 grams up to 7.5 Kg, or more. The weigh-in-motion scale system can be used to weigh articles when there are relatively wide swings in weight from one object to a subsequent object. For example, one object may have a lowest weight (of objects to be weighed) and another object has a highest weight, wherein the highest object weight is greater than or equal to about 1.1, 1.2, 1.3, etc. up to less than or equal to about 1,500, or more, times the lowest object weight. (These ratios of weights are those of the objects themselves after taring out weights of the LSM conveyor and the vehicles.) In some cases, the weigh-in-motion scale system may be able to achieve accuracy of less than 0.60 g standard deviation (1 sigma) across three objects having relatively wide swings in weight from one object to a subsequent object when the objects are moving at 2 m/s. In one case, for example, the weigh-in-motion scale system may be able to achieve accuracy of less than 0.60 g standard deviation (1 sigma) when transporting three different bottle sizes (e.g., bottles containing 9 oz. (0.27 L), 22 oz. (0.65 L), and 40 oz. (1.2 L)) when the bottles are moving at 2 m/s.

If wheeled vehicles 24 are used, it may be desirable for the wheel base to be relatively long (e.g., greater than 40 mm, 41 mm, 42 mm, etc. or any amounts that increase in 1 mm increments in such a series of lengths) up to less than or equal to about 300 mm, in order to provide more stability and lower variation in weight measurements due to instability of the object being weighed. The length of the wheel base should, of course, not be so long that it significantly reduces the throughput of vehicles through the checkweigher, or interferes with the vehicle's ability to negotiate any turns on the track.

The weigh-in-motion scale and system and method described herein may provide a number of advantages. It should be understood, however, that such advantages are not required to be present unless set forth in the appended claims.

The weigh-in-motion scale and system is capable of weighing articles traveling at a high speed (such as when the articles are being conveyed on a conveyor that is running at speeds up to 2 m/s on MagneMotion's MAGNEMOVER LITE® LSM conveyor). On other conveyors, the weigh-in-motion scale and system is believed to be capable of weighing articles traveling at speeds of 3, 4, 5 m/s up to speeds of 20 m/s, or more.

The articles 38 do not need to be removed from the conveyor in order to weigh the articles when the system can track vehicle ID's and known tare weights to subtract the tare weight from the weight that the checkweigher reads. If the articles are contained in any type of packing material, the system can also subtract the weight of such packing materials.

Typically, checkweighers are used to measure objects with similar weights. The system and method described herein will allow small to large articles being produced on the same system to be accurately weighed. The checkweigher (particularly if it utilizes an EMFR weigh cell) allows this large swing in weights to be accurately measured.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A weigh-in-motion system for weighing objects on a linear synchronous motor conveyor, wherein the linear synchronous motor conveyor includes: sections of a linear synchronous motor which motor sections include propulsion coils; a cable through which power and communication can be provided to the propulsion coils; sections of track on which a vehicle can transport an object; and at least one vehicle, said system comprising:

a. a support structure for supporting the following: a weigh cell, a section of a linear synchronous motor conveyor track, a vehicle for transporting an object, and an object; and b. the weigh cell on said support structure on which a section of the linear synchronous motor conveyor track rests directly or indirectly, wherein said weigh cell is configured to weigh vehicles and objects while in motion; wherein the support structure is configured to also support at least one section of the linear synchronous motor, wherein the linear synchronous motor sections are positioned adjacent to one another, wherein the support structure is configured to support a section of the linear synchronous motor without supporting one or more adjacent sections of the linear synchronous motor, wherein the support structure is configured to support two sections linear synchronous motor and one section of linear synchronous motor conveyor track, and the section of the linear synchronous motor track supported by the support structure spans at least portions of the two sections of linear synchronous motor.

2. The weigh-in-motion system of claim 1 wherein the section of linear synchronous motor conveyor track and the section of the linear synchronous motor supported by the support structure are coextensive.

3. The weigh-in-motion system of claim 1 wherein the section of linear synchronous motor conveyor track and the section of the linear synchronous motor supported by the support structure each have ends that are not coextensive, wherein the section of track is shorter than the section of linear synchronous motor, wherein at least one end of said section of track terminates short of at least one end of said section of the linear synchronous motor, and a portion at the end of at least one adjacent section of track is cantilevered over the section of linear synchronous motor supported by said support structure.

4. The weigh-in-motion system of claim 1 wherein the weigh cell is an electromagnetic force restoration (EMFR) weigh cell.

5. A weigh-in-motion system for weighing objects on a linear synchronous motor conveyor, wherein the linear synchronous motor conveyor includes: sections of a linear synchronous motor which motor sections include propulsion coils; a cable through which power and communication can be provided to the propulsion coils; sections of track on which a vehicle can transport an object; and at least one vehicle, said system comprising:

a. a support structure for supporting the following: a weigh cell, a section of a linear synchronous motor conveyor track, a vehicle for transporting an object, and an object; and b. the weigh cell on said support structure on which a section of the linear synchronous motor conveyor track rests directly or indirectly, wherein said weigh cell is configured to weigh vehicles and objects while in motion; wherein the support structure is configured to also support at least one section of the linear synchronous motor, wherein the linear synchronous motor sections are positioned adjacent to one another, wherein the support structure is configured to support a section of the linear synchronous motor without supporting one or more adjacent sections of the linear synchronous motor, wherein the section of linear synchronous motor conveyor track and the section of the linear synchronous motor supported by the support structure each have ends that are not coextensive, wherein the section of track is shorter than the section of linear synchronous motor, wherein at least one end of said section of track terminates short of at least one end of said section of the linear synchronous motor, and a portion at the end of at least one adjacent section of track is cantilevered over the section of linear synchronous motor supported by said support structure.

6. The weigh-in-motion system of claim 5 wherein the support structure is configured to support two sections linear synchronous motor and one section of linear synchronous motor conveyor track, and the section of the linear synchronous motor track supported by the support structure spans at least portions of the two sections linear synchronous motor.

7. The weigh-in-motion system of claim 5 wherein the weigh cell is an electromagnetic force restoration (EMFR) weigh cell.

* * * * *